Patented Jan. 14, 1936

2,028,064

UNITED STATES PATENT OFFICE 2,028,064

MANUFACTURE OF GLYCOLLIC ACID

Ernest F. Grether and Russell B. Du Vall, Midland, Mich., assignors to The Dow Chemical Company, Midland, Mich., a corporation of Michigan No Drawing. Application March 29, 1935, Serial No. 13,708

10 Claims. (Cl. 260—112)

This invention concerns an improved method of manufacturing glycollic acid from chloroacetic acid.

It is well known that glycollic acid can be formed in excellent yield by hydrolysis of chloroacetic acid or a salt thereof, but no method well suited to commercial practice is known for separating the glycollic acid product from the hydrochloric acid or metal chloride formed therewith. For instance, glycollic acid has been prepared by hydrolyzing chloroacetic acid with water and removing hydrochloric acid from the hydrolysis mixture by evaporation under vacuum. Such procedure is tedious, necessitates careful temperature control during evaporation in order to avoid the formation of glycollic acid anhydrides, and the hydrochloric acid evolved from the hydrolysis mixture is corrosive to metal equipment. Another method comprises hydrolyzing potassium chloroacetate with water, evaporating the hydrolysis mixture to dryness, and extracting glycollic acid from the residue with acetone. This method is disadvantageous from a commercial viewpoint in that it involves the use of a costly organic solvent and that careful temperature control is required during the evaporation to avoid converting glycollic acid into its anhydrides. Glycollic acid has also been produced by hydrolyzing chloroacetic acid with an aqueous calcium carbonate slurry, crystallizing calcium glycollate from the hydrolysis mixture, separating the crystals and washing them free of chlorides, with water, and thereafter treating the crystalline material with an aqueous oxalic acid solution to form an aqueous glycollic acid solution and a precipitate of calcium oxalate. The last mentioned method includes a number of disadvantageous features, in that the calcium glycollate and calcium chloride formed by the hydrolysis tend to unite and form a double salt which is somewhat more soluble than calcium glycollate. As a result a considerable portion of the glycollate usually remains dissolved, and the crystalline material is usually contaminated with calcium chloride contained in the double salt. A number of recrystallizations from water are necessary to completely free the calcium glycollate from calcium chloride, during which operations a considerable portion of the glycollate is lost in the mother liquors. Furthermore, the calcium glycollate frequently crystallizes in the form of a hydrate which is difficult to filter and wash with water.

It is an object of the present invention to provide a simple and economical method of manufacturing substantially pure glycollic acid in good yield from chloroacetic acid or its alkali metal salts. We have discovered that by treating a hot aqueous solution of an alkali metal glycollate and an alkali metal chloride with a water-soluble calcium salt in a proportion not appreciably exceeding the chemical equivalent of the glycollate, substantially pure calcium glycollate may be precipitated in the form of sand-like anhydrous crystals which may readily be filtered and washed free of adhering mother liquor with hot water. On the basis of this discovery we have invented the improved method of manufacturing glycollic acid hereinafter fully described and particularly pointed out in the claims.

Our method comprises the steps of:—

(1) Hydrolyzing chloroacetic acid with an aqueous alkali metal base to obtain a substantially neutral aqueous solution of alkali metal glycollate and alkali metal chloride;

(2) Treating such solution, preferably while hot, with a water-soluble calcium salt in amount not appreciably exceeding the chemical equivalent of the glycollate, and crystallizing calcium glycollate from the solution while maintaining the latter at a temperature sufficiently high so that the crystals are obtained in anhydrous form;

(3) Separating the crystalline material and treating the same with an aqueous solution containing:—(a) an acid capable of reacting with the calcium glycollate to liberate glycollic acid and precipitate another calcium salt having a lower solubility in water than calcium glycollate, and (b) sufficient water to dissolve the glycollic acid liberated by such reaction;

(4) Separating the resultant aqueous glycollic acid solution from the precipitate; and (5) If crystalline glycollic acid is desired, evaporating the solution under vacuum at a temperature below 60°, and preferably below 40° C. when concentrated, to crystallize the glycollic acid.

The hydrolysis step is preferably carried out by heating chloroacetic acid to a reaction temperature with an aqueous solution containing twice its chemical equivalent of an alkali metal base, e. g. a hydroxide, carbonate, or bicarbonate of sodium or potassium. For convenience in expressing the proportions of materials used, one mole of chloroacetic acid is considered herein to be one chemical equivalent of said compound. The hydrolysis is most conveniently carried out by heating the chloroacetic acid with a from 5 to 30 per cent by weight aqueous solution of the base under reflux at atmospheric pressure, but it may be carried out in a closed reactor under pressure, if desired, and the base may be employed in concentrations other than those just stated. During hydrolysis samples of the reaction mixture are withdrawn from time to time and analyzed for inorganic chlorides, and heating is preferably continued until it is found by such analysis that inorganic chloride has been formed in amount chemically equivalent to the chloroacetic acid employed.

The hydrolysis mixture is treated, while hot, with a water-soluble calcium salt, such as calcium chloride or nitrate, preferably in amount chemically equivalent to the glycollate present. By such treatment calcium glycollate is formed and is usually precipitated nearly quantitatively in the form of anhydrous crystals resembling grains of sand, but it may sometimes be desirable to concentrate the mixture by evaporation in order to assure substantially complete precipitation of the calcium salt. During such treatment for the formation of calcium glycollate, the mixture is preferably maintained hot, e. g. at a temperature above 70° and preferably above 80° C., since at lower temperatures the salt is sometimes precipitated in a bulky hydrated form or as extremely fine crystals which are difficult to filter, wash, or otherwise handle. The temperature necessary to obtain the calcium glycollate in the desired anhydrous granular form may vary somewhat with changes in the degree of dilution of the mixture, the kind and proportion of alkali metal chloride present, etc. However, when the calcium glycollate is obtained in such bulky or extremely fine crystalline form, it may be converted to the desired granular form merely by heating the same with water to a higher temperature. Accordingly, temperature control is simple. The treatment need merely be carried out at a temperature sufficiently high so that the calcium glycollate is precipitated as, or is converted into, the desired granular form.

After crystallizing the calcium glycollate in the desired anhydrous granular form, the aqueous mixture may, if desired, be permitted to cool somewhat, e. g. to 40° C., and in some instances to room temperature, without converting the crystals to the undesirable bulky hydrated form. The exact temperature to which the mixture may be permitted to cool without hydration occurring is dependent upon the kind and concentration of inorganic chlorides present in the mother liquor. In general, the higher the concentration of such dissolved chloride, the lower the temperature to which the mixture may be cooled without hydrating the calcium glycollate. When mixed with pure water, anhydrous crystals of calcium glycollate tend to become hydrated quite rapidly at temperatures below 40° C.

The crystalline calcium glycollate is separated from the aqueous mixture, e. g. by filtration or decantation, and washed free of adhering mother liquor with water heated to above 40° C. The glycollate is then mixed with sufficient water to dissolve its chemical equivalent of glycollic acid. It is then treated with its chemical equivalent of an acid such as sulphuric or oxalic acid which is capable of forming a calcium salt having a lower solubility in water than calcium glycollate. By such treatment there is formed an aqueous solution of substantially pure glycollic acid and a precipitate of the calcium salt of the added acid. The aqueous glycollic acid solution is separated and may be used or marketed as such or, if crystalline glycollic acid is desired, the solution is evaporated under vacuum at a temperature below 60° C., preferably below 40° C., to crystallize the product. By operating in the manner described above, pure crystalline glycollic acid has been prepared from chloroacetic acid in greater than 90 per cent the theoretical yield, based on the chloroacetic acid employed.

The following example illustrates one way in which the principle of our invention has been applied, but is not to be construed as limiting the invention.

*Example*

A mixture of 59 pounds (0.625 mol) of chloroacetic acid, 69.5 pounds of soda ash (containing approximately 0.625 mol of $Na_2CO_3$), and 210 pounds of water was heated to boiling under reflux for 4 hours. A solution of 34.5 pounds (approximately 0.3 mol) of calcium chloride in 45 pounds of water was then added to the hot reaction mixture, whereby calcium glycollate was precipitated in the form of anhydrous granular crystals. The mixture was filtered and the residue was washed free of adhering mother liquor with hot water and dried. There was obtained 54 pounds (0.284 mol) of anhydrous calcium glycollate, the yield being 91.5 per cent of theoretical based on the chloroacetic acid employed. 50 pounds (0.263 mol) of the calcium glycollate was mixed with 270 pounds of water. An aqueous sulphuric acid solution containing 25.75 pounds (0.263 mol) of 100 per cent sulphuric acid and approximately 28.5 pounds of water was added and the mixture was heated to boiling for 1 hour. It was then cooled, filtered, and the residue was washed free of acid with water, the washings being combined with the filtrate. There was obtained a substantially pure aqueous glycollic acid solution containing approximately 40 pounds (0.526 mol) of glycollic acid.

Although we prefer to acidify calcium glycollate in the presence of water to produce an aqueous glycollate acid solution, such acidification may, if desired, be carried out in the presence of an aqueous alcohol solution, an organic solvent such as dioxane, or in the presence of any other inert solvent capable of dissolving the glycollic acid product but not the calcium salt of the acid added to liberate the glycollic acid.

Other modes of applying the principle of our invention may be employed instead of those explained, change being made as regards the method herein disclosed, provided the step or steps stated by any of the following claims or the equivalent of such stated steps or steps be employed.

We therefore particularly point out and distinctly claim as our invention:—

1. The method which comprises treating an aqueous solution of an alkali metal glycollate and alkali metal chloride with a water-soluble calcium salt in amount not appreciably exceeding the chemical equivalent of the glycollate, crystallizing calcium glycollate from the mixture, and subjecting the mixture to a temperature sufficiently high so that the crystals are obtained in anhydrous form.

2. The method which comprises treating an approximately neutral aqueous solution of an alkali metal glycollate and alkali metal chloride with a water-soluble calcium salt at a temperature sufficiently high so that calcium glycollate is precipitated in the form of anhydrous granular crystals, said water-soluble calcium salt being employed in amount not appreciably exceeding the chemical equivalent of the glycollate.

3. The method which comprises treating an approximately neutral aqueous solution of an alkali metal glycollate and alkali metal chloride at a temperature above 70° C. with a water-soluble calcium salt in amount not exceeding the chemical equivalent of the glycollate, to precipitate calcium glycollate in the form of anyhydrous granular crystals, and separating the latter.

4. The methode which comprises treating an approximately neutral aqueous solution of sodium glycollate and sodium chloride at a temperature above 80° C. with calcium chloride in amount chemically equivalent to the glycollate, crystallizing calcium glycollate from the mixture while maintaining the latter at a temperature above 80° C., and separating the crystals.

5. The method which comprises treating an aqueous solution of an alkali metal glycollate and alkali metal chloride with a water-soluble calcium salt in amount not exceeding the chemical equivalent of the glycollate, crystallizing calcium glycollate from the mixture while maintaining the latter at a temperature sufficiently high so that the crystals are obtained in anhydrous granular form, separating the crystalline calcium glycollate, and treating the same with approximately its chemical equivalent of an aqueous acid capable of reacting therewith to liberate glycollic acid and form a calcium salt which is less soluble in water than calcium glycollate.

6. The method which comprises treating an approximately neutral aqueous solution of an alkali metal glycollate and alkali metal chloride at a temperature above 70° C. with a water-soluble calcium salt in amount not exceeding the chemical equivalent of the glycollate, crystallizing calcium glycollate from the mixture at a temperature above 70° C., separating the crystalline calcium glycollate, and treating the same with approximately its chemical equivalent of sulphuric acid in the presence of sufficient water to dissolve the liberated glycollic acid.

7. The method which comprises treating an approximately neutral aqueous solution of sodium glycollate and sodium chloride at a temperature above 80° C. with calcium chloride in amount approximating the chemical equivalent of the glycollate, crystallizing calcium glycollate from the mixture at a temperature above 80° C., separating the crystalline calcium glycollate, treating the latter with approximately its chemical equivalent of sulphuric acid in the presence of sufficient water to dissolve the glycollic acid liberated by such treatment, separating the resultant aqueous glycollic acid solution from the calcium sulphate formed by the treatment, and evaporating said aqueous glycollic acid solution at a temperature below 60° C. to crystallize glycollic acid therefrom.

8. In a method of preparing glycollic acid, the steps which consist in hydrolyzing chloroacetic acid by heating the same with approximately twice its chemical equivalent of an aqueous alkali metal base, treating the hydrolysis mixture at a temperature above 70° C. with a water-soluble calcium salt, the latter being employed in amount approximating the chemical equivalent of the chloroacetic acid hydrolyzed, crystallizing calcium glycollate from the mixture while maintaining the latter at a temperature above 70° C., separating the crystalline calcium glycollate, and treating the latter with approximately its chemical equivalent of an acid capable of forming a calcium salt which is less soluble in water than calcium glycollate.

9. In a method of making glycollic acid, the steps which consist in heating chloroacetic acid with an aqueous solution of an alkali metal base to form a substantially neutral aqueous solution of an alkali metal glycollate and alkali metal chloride, treating the solution at a temperature above 80° C. with calcium chloride in amount approximating the chemical equivalent of the glycollate, crystallizing calcium glycollate from the mixture while maintaining the latter at a temperature above 80° C., separating the crystalline calcium glycollate, treating the latter with approximately its chemical equivalent of sulphuric acid in the presence of sufficient water to dissolve the glycollic acid liberated by such treatment, separating the resultant aqueous glycollic acid solution from the calcium sulphate formed by such treatment, and evaporating said aqueous glycollic acid solution at a temperature below 40° C. to crystallize glycollic acid therefrom.

10. The method which comprises hydrolyzing chloroacetic acid by heating the same with an aqueous solution containing approximately twice its chemical equivalent of an alkali metal base, treating the hydrolysis mixture at a temperature above 70° C. with a water-soluble calcium salt in amount representing not more than the chemical equivalent of the chloroacetic acid hydrolyzed, and crystallizing calcium glycollate from the mixture while maintaining the latter at a temperature above 70° C.

ERNEST F. GRETHER.
RUSSELL B. DU VALL.